US009475648B2

(12) United States Patent
Duroe et al.

(10) Patent No.: US 9,475,648 B2
(45) Date of Patent: Oct. 25, 2016

(54) TRANSPORT APPARATUS HAVING A MEASURING SYSTEM AND METHODS THEREFOR

(71) Applicant: Corning Incorporated, Corning, NY (US)

(72) Inventors: John Christian Duroe, Big Flats, NY (US); Shawn Michael Huyler, Nelson, PA (US); Julie Marie Koski, Corning, NY (US); Kevin Lee Wasson, Elmira, NY (US)

(73) Assignee: Corning Incorporated, Corning, NY (US)

( * ) Notice: Subject to any disclaimer, the term of this patent is extended or adjusted under 35 U.S.C. 154(b) by 62 days.

(21) Appl. No.: 14/450,524

(22) Filed: Aug. 4, 2014

(65) Prior Publication Data

US 2014/0343721 A1    Nov. 20, 2014

Related U.S. Application Data

(62) Division of application No. 12/915,662, filed on Oct. 29, 2010, now Pat. No. 8,834,073.

(51) Int. Cl.
*B65G 51/03* (2006.01)
*B65G 43/08* (2006.01)

(52) U.S. Cl.
CPC ............... *B65G 43/08* (2013.01); *B65G 51/03* (2013.01)

(58) Field of Classification Search
CPC .................................................... B65G 51/03
USPC ...... 406/12, 19, 88, 197; 414/676; 271/3.23, 271/195; 384/12; 73/570.5
See application file for complete search history.

(56) References Cited

U.S. PATENT DOCUMENTS 2,805,898 A    9/1957 Willis
3,479,092 A *  11/1969 Ward ..................... B65G 51/03
                                                    406/19

(Continued)

FOREIGN PATENT DOCUMENTS

JP    2007-088201 A    4/2007

OTHER PUBLICATIONS

2nd Chinese Office Action, dated Jul. 20, 2015, pp. 1-16, Chinese Application No. 201110455197.4, The State Intellectual Property Office of The People's Republic of China, China.

*Primary Examiner* — Joseph Dillon, Jr.
(74) *Attorney, Agent, or Firm* — Joseph M. Homa; Charles Greene

(57) ABSTRACT

A transport apparatus includes a bearing assembly for transporting an article. The bearing assembly includes a support structure for receiving the article, and a plenum housing for receiving the support structure. The plenum housing and the support structure define a plenum cavity, the plenum cavity being configured to receive and direct a flowing gas for floatingly supporting the article above the support structure. The bearing assembly further includes at least one sensor assembly, which includes a sensor for transmitting and receiving energy emissions for determining a location of the article relative to the support structure. The sensor assembly may determine the location of the article relative to the support structure substantially through at least one aperture located on the bearing assembly. The article location determined by the sensor assembly may be communicated to a display panel or a control unit for adjusting the location if necessary.

16 Claims, 5 Drawing Sheets

(56) References Cited

U.S. PATENT DOCUMENTS

| | | | | |
|---|---|---|---|---|
| 3,597,021 A * | 8/1971 | Thomas | ............................ | 384/12 |
| 3,603,646 A * | 9/1971 | Leoff | ............................ | 406/89 |
| 3,865,254 A * | 2/1975 | Johannsmeier | ............... | 414/676 |
| 3,947,236 A * | 3/1976 | Lasch, Jr. | ........................ | 432/11 |
| 3,948,564 A * | 4/1976 | Flint | ............................ | 406/31 |
| 4,157,140 A * | 6/1979 | Glasgow | ........................ | 414/676 |
| 4,165,132 A * | 8/1979 | Hassan et al. | ................... | 406/10 |
| 4,371,309 A * | 2/1983 | Principe et al. | ............... | 414/676 |
| 4,874,273 A * | 10/1989 | Tokisue et al. | ................ | 406/88 |
| 4,877,485 A * | 10/1989 | Carson | ........................ | 162/263 |
| 5,065,858 A * | 11/1991 | Akam et al. | .................. | 198/493 |
| 5,108,513 A * | 4/1992 | Muller et al. | ................... | 134/15 |
| 5,205,991 A * | 4/1993 | Avery et al. | .................. | 422/129 |
| 5,379,999 A * | 1/1995 | Barzideh et al. | ............. | 271/264 |
| 5,406,058 A * | 4/1995 | Lipp | ............................ | 219/774 |
| 5,425,217 A * | 6/1995 | Lobash et al. | ................. | 53/435 |
| 5,518,360 A * | 5/1996 | Toda | ................ | H01L 21/67787 |
| | | | | 384/12 |
| 5,582,400 A * | 12/1996 | Seydel | ........................ | 271/176 |
| 5,634,636 A * | 6/1997 | Jackson et al. | ............... | 271/225 |
| 6,027,112 A * | 2/2000 | Guenther | ............... | B65G 51/03 |
| | | | | 271/194 |
| 6,039,316 A * | 3/2000 | Jackson | ................ | B65H 5/066 |
| | | | | 271/194 |
| 6,119,052 A * | 9/2000 | Guenther | ............... | B65H 5/228 |
| | | | | 271/194 |
| 6,354,789 B2 * | 3/2002 | Takeuchi et al. | ............. | 414/676 |
| 6,409,434 B1 * | 6/2002 | Winther | ........................ | 406/15 |
| 6,612,418 B2 * | 9/2003 | Flom | ...................... | B65B 35/28 |
| | | | | 198/460.1 |
| 6,626,612 B2 * | 9/2003 | Knapp | ............................ | 406/19 |
| 6,810,297 B2 * | 10/2004 | Adin | ...................... | B65G 51/03 |
| | | | | 294/64.3 |
| 7,140,827 B2 * | 11/2006 | Ikehata | ................ | B65G 49/063 |
| | | | | 406/19 |
| 7,238,309 B2 * | 7/2007 | Adriaansen et al. | ........ | 264/40.1 |
| 7,269,475 B1 * | 9/2007 | Hogg et al. | ................... | 700/229 |
| 7,326,025 B2 * | 2/2008 | Viluan et al. | .................. | 414/676 |
| 7,375,361 B2 * | 5/2008 | Turner et al. | ............... | 250/559.3 |
| 7,438,546 B2 * | 10/2008 | Adriaansen et al. | ......... | 425/135 |
| 7,513,716 B2 * | 4/2009 | Hayashi | ................ | B65G 47/22 |
| | | | | 406/87 |
| 7,530,778 B2 * | 5/2009 | Yassour et al. | ............... | 414/676 |
| 7,667,857 B2 * | 2/2010 | Nishio | ........................ | 356/614 |
| 7,704,019 B2 * | 4/2010 | Toda et al. | ...................... | 406/88 |
| 7,740,240 B2 * | 6/2010 | Iwakiri | ........................ | 271/97 |
| 8,057,602 B2 * | 11/2011 | Koelmel et al. | ............... | 118/730 |
| 8,088,255 B2 * | 1/2012 | Alev et al. | ..................... | 162/263 |
| 8,162,571 B2 * | 4/2012 | Wada | .................. | H05K 13/028 |
| | | | | 406/88 |
| 8,317,194 B2 * | 11/2012 | Werner et al. | ................. | 271/264 |
| 8,403,601 B2 * | 3/2013 | Yano et al. | ..................... | 406/155 |
| 2002/0060407 A1 * | 5/2002 | Braun | ...................... | B41F 23/06 |
| | | | | 271/195 |
| 2007/0090188 A1 * | 4/2007 | Li et al. | .......................... | 235/449 |
| 2007/0160454 A1 * | 7/2007 | Iida | ............................ | 414/806 |
| 2007/0212174 A1 * | 9/2007 | Hayashi | ................ | B65G 47/22 |
| | | | | 406/93 |
| 2008/0031696 A1 * | 2/2008 | Toda | ...................... | B65G 47/24 |
| | | | | 406/12 |
| 2009/0274523 A1 * | 11/2009 | Li et al. | ........................... | 406/4 |
| 2010/0085578 A1 * | 4/2010 | Weiss et al. | .................. | 356/614 |
| 2011/0268511 A1 * | 11/2011 | Iida | ...................... | B65G 49/065 |
| | | | | 406/88 |
| 2013/0199448 A1 * | 8/2013 | Granneman | .......... | B65G 51/03 |
| | | | | 118/729 |

* cited by examiner

TRANSPORT APPARATUS HAVING A MEASURING SYSTEM AND METHODS THEREFOR

This application is a divisional and claims the benefit of priority to U.S. application Ser. No. 12/915,662 filed on Oct. 29, 2010 and entitled "Transport Apparatus Having A Measuring System And Methods Therefor", which is hereby incorporated by reference for all purposes as if fully set forth herein.

BACKGROUND

1. Field of the Disclosure

A transport apparatus is disclosed and methods therefor, specifically a transport apparatus that includes a gas bearing having a measuring system for determining a location of an article being transported.

2. Technical Field

Such articles of manufacture as extruded logs or extrudates of, for example, ceramic material are used in a variety of applications including, for example, substrates for automotive exhaust, as in catalytic converters, particulate traps within diesel engines, and chemical filtration processes. The manufacturing process for these extrudates typically includes the transfer of an uncured or wet log along a manufacturing line subsequent to being extruded from an extrusion die.

Transfer of such articles is typically conducted via a process that uses such non-contact transport devices as, for example, an air bearing assembly on the manufacturing line, which requires an operator to manually, e.g., visually, determine the log condition, location or height as it travels along the manufacturing line. Close tolerances on the log demand proper location, or ride height, to prevent product damage. However, the distances involved are very small relative to the size of the article, and visual inspection during transport can be difficult. Consequently, it is typical for much subjectivity in determining ride height, and damage to the logs during transport may result.

Apparatuses and methods are therefore needed which remove subjectivity associated with manual, or visual, monitoring of an article during transport, for example, an extruded ceramic log or other extrudate on a gas bearing, including maintaining an optimum ride height on the gas bearing.

SUMMARY

A transport apparatus includes a bearing assembly for transporting an article. The bearing assembly includes a support structure, which has a first side and a second side, and a surface disposed between the first and second sides, the surface configured to receive the article. The support structure also has at least one aperture disposed through the surface.

The bearing assembly also includes a plenum housing for receiving the support structure. The plenum housing and the support structure define a plenum cavity, which is configured to receive and direct a flowing gas.

The bearing assembly further includes at least one sensor assembly. The sensor assembly includes a sensor for transmitting and receiving energy emissions for determining a location of the article relative to the support structure. The sensor may be a laser sensor, a magnetic sensor, an electromagnetic sensor, an electrostatic sensor, a capacitance sensor, an ultrasonic sensor, a photoelectric sensor, an inductive sensor, or combinations of the same.

In one embodiment, the sensor assembly may include a base plate for receiving the sensor, and an adjustment mechanism for adjusting the position of the base plate and the sensor in relation to the support structure. The sensor, for example, may be located proximal to the at least one aperture, the sensor determining the location of the article relative to the support structure substantially through the at least one aperture. The sensor assembly may be located within the plenum cavity.

A method is disclosed for monitoring and adjusting a location of an article in longitudinal motion on a transport apparatus, including providing an article and a transport apparatus, the transport apparatus being adapted to receive the article on a layer of a gas from a gas flow source. The method also includes providing at least one sensor assembly, the sensor assembly being configured to transmit and receive an energy emission to sense a location of the article, and to communicate the location to at least one control unit. Based upon a comparison to a predetermined range of location values, the control unit may communicate instructions to at least one gas flow source, increasing or decreasing a gas flow to the plenum cavity, changing the location of the article.

Additional features are set forth in the detailed description which follows, and in part will be readily apparent to those skilled in the art from that description or recognized by practicing the described embodiments and the claims, as well as the appended drawings.

It is to be understood that both the general description and the detailed description are exemplary, and are intended to provide an overview or framework to understand the claims. The accompanying drawings are included to provide a further understanding, and are incorporated in and constitute a part of this specification. The drawings illustrate one or more embodiment(s), and together with the description serve to explain principles and operation of the embodiments.

DETAILED DESCRIPTION

Figure 1:
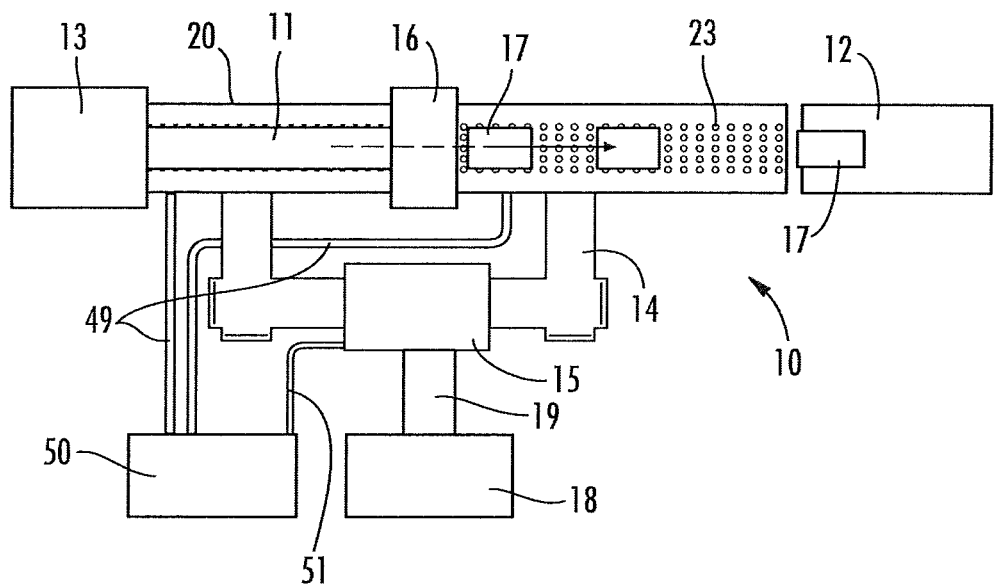
FIG. 1 is a schematic layout view of a transport apparatus.

Reference is now made in detail to embodiments of the disclosure, examples of which are illustrated in the accompanying drawings. Whenever possible, identical or similar reference numerals are used throughout the drawings to refer to identical or similar parts. It should be understood that the embodiments disclosed are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to, the embodiments described herein.

A transport apparatus is disclosed having a bearing assembly for transporting an article from a first location to a second location. The bearing assembly includes a support structure for receiving the article, for example, on a layer of gas, and floatingly supporting the article. The bearing assembly further includes a sensor assembly for determining a location of the article, for example, relative to the support structure. The sensor assembly may be associated with the support structure. The support structure includes at least one aperture; the sensor assembly may utilize the at least one aperture to determine the location of the article. The sensor assembly may be in communication with at least a display configured to communicate the article location to an operator. The sensor assembly may further be in communication with a control unit that may provide instructions to a header, valve body, or blower to change the location of the article in response to, for example, comparison to a predetermined location value or range of location values.

A schematic of transport apparatus 10 (FIG. 1) includes an article 11, which may be, for example, a ceramic extrudate log extruded from an extruder 13. In other embodiments, article 11 may be, for example, a glass sheet or an optical fiber. Article 11 may be transported along a bearing assembly 20 to, for example, a saw 16, or other cutting apparatus, where article 11 may be cut into at least one article segment 17 of predetermined length. Article segment 17 may be further transported along, for example, another bearing assembly 20 to, for example, a ceramic dryer 12, a storage area, a packing area, or other post processing area.

Transport apparatus 10 also includes a system for supplying a gas to bearing assembly 20. Gas flow source 18 supplies a flowing gas, for example, air, along a valve body gas pipe 19 to, for example, a header or valve body 15. Valve body 15 supplies at least a portion of the flowing gas along at least one bearing gas pipe 14 to bearing assembly 20.

Figure 2:
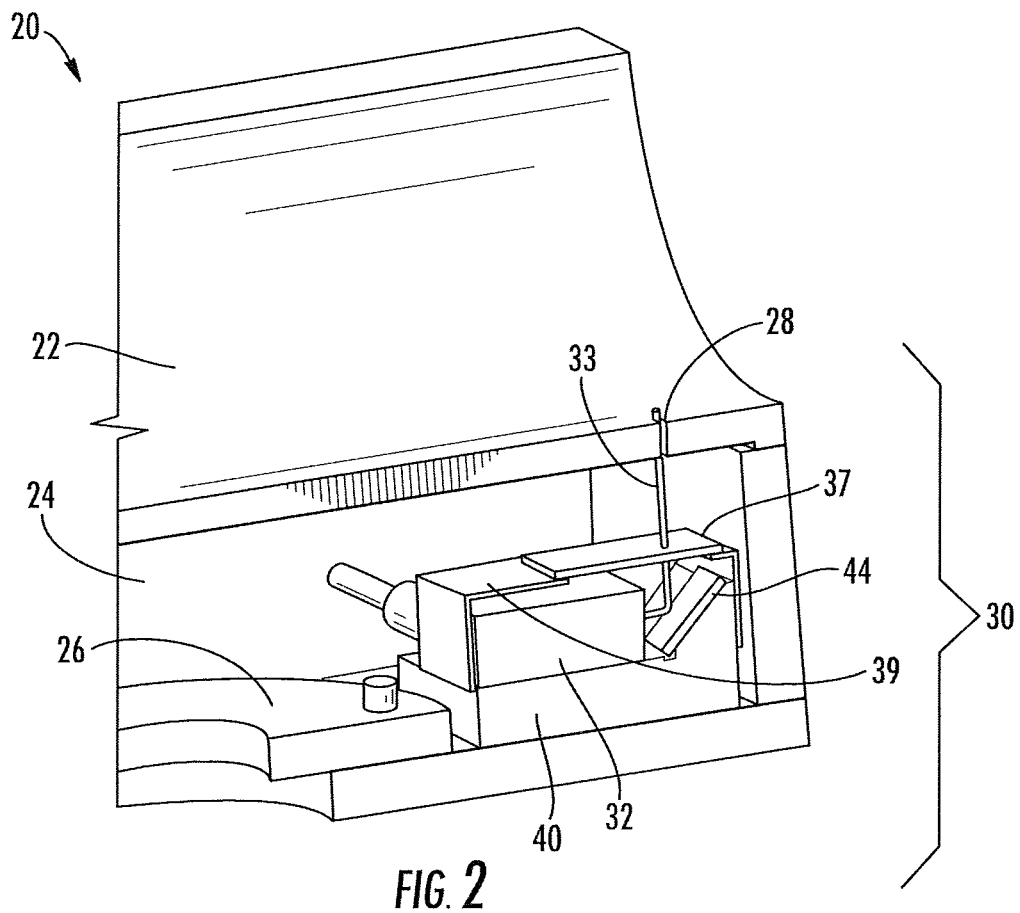
FIG. 2 is a sectioned isometric view of a bearing assembly of the transport apparatus of FIG. 1.

Valve body 15, in some embodiments, may be in communication with a control unit 50 that sends a signal along a control cable 51 in response to data received from a sensor assembly 30 (FIG. 2) associated with bearing assembly 20. Sensor assembly 30 may communicate with control unit 50 along, for example, a sensor cable 49. Other communication methods, for example, wireless, or infrared signals, are possible.

Bearing assembly 20 (FIG. 2) may include, for example, a support structure 22 configured to receive article 11 or segment 17. Support structure 22 may be configured to receive such article shapes for transport as substantially flat, substantially cylindrical, elongated oval, elongated bi-radial ovoid, elongated rectangular, or substantially square shapes. Support structure 22 may be attached to a plenum housing 24. A plenum cavity may be defined by the attachment of support structure 22 and plenum housing 24. The plenum cavity may be adapted to receive the flowing gas through an opening surrounded, for example, by a gas supply flange 26. Support structure 22 may include a plurality of gas apertures 23 (FIG. 1). The plenum cavity may direct the flowing gas to pass through gas apertures 23 for floatingly supporting article 11, or segment 17. Gas supply flange 26 may be included on plenum housing 24 to influence the rate of gas flow into the plenum cavity by way of an inner diameter or aperture size, and to assist in a secure attachment of gas pipe 14 to plenum housing 24. Gas apertures 23 are not shown in subsequent drawings for clarity.

Sensor assembly 30 includes an article sensor 32 (field effect sensor), for example, an electromagnetic, or laser sensor. Other field effect are possible, including, but not limited to, a magnetic sensor, an electrostatic sensor, a capacitance sensor, an ultrasonic sensor, a photoelectric sensor, and an inductive sensor. Sensor 32, in exemplary embodiments, sends, radiates, or otherwise emits a signal or energy emission 33 that may reflect upon a portion of the surface of article 11, with at least part of the emission 33 returning to, for example, a corresponding receiver to determine the location of article 11 relative to, for example, sensor 32, or other reference datum. Emission 33 may be a focused emission, as in, for example, a narrow beam from a laser sensor, or emission 33 may be a more diffuse emission, as in, for example, a broad emission from a photoelectric sensor. Sensor 32 may be mounted, for example, on a base plate 40 that may place sensor 32 in a position for most effectively sensing a location of article 11. In exemplary embodiments, base plate 40 may be placed on an interior surface, for example, a floor surface, of plenum housing 26. Base plate 40 may position sensor 32 below at least one sensor aperture 28, placing support structure 22 between sensor assembly 30 and article 11 or segment 17. Aperture 28 may be a round hole or a slot. A suitable sensor 32 may be selected to accommodate particular space, orientation, environmental, or material requirements. In some embodiments, sensor aperture 28 may be selected from one of gas apertures 23.

Figure 8:
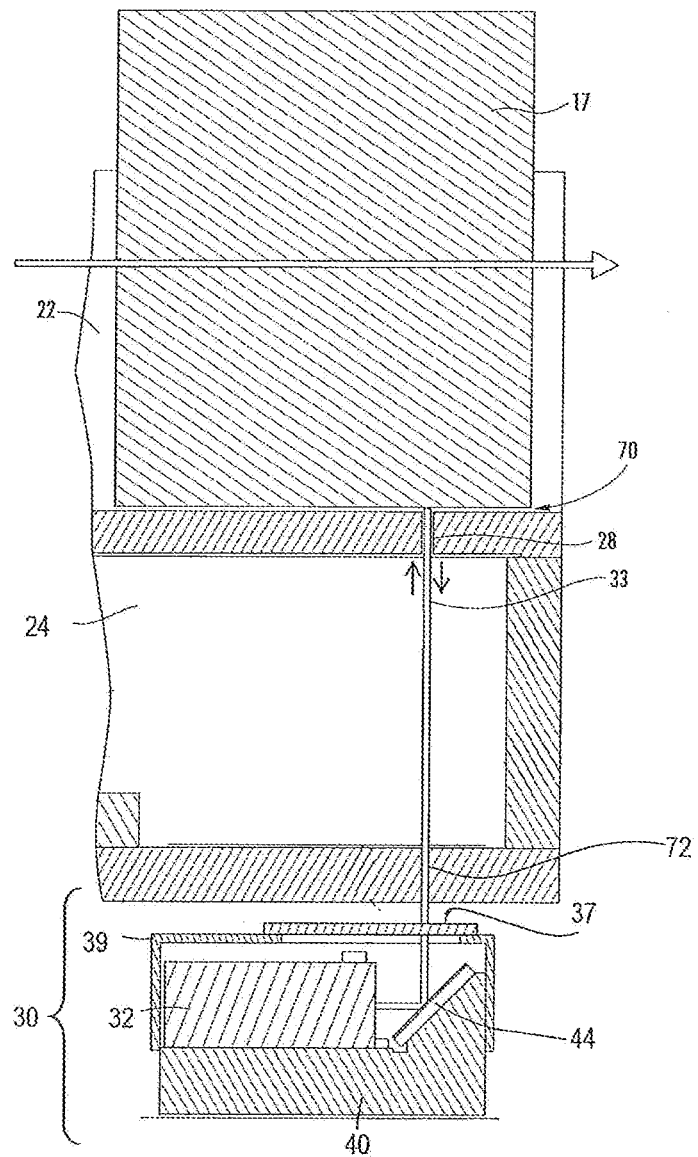

In some embodiments, sensor assembly 30 may be placed in such alternate locations as above, beside, or below bearing assembly 20. Some sensors, for example, may be sensitive to high heat or high humidity, which may adversely affect sensor performance, making it necessary to place the sensors in alternate locations. In one embodiment, sensor assembly 30 may be placed outside of, for example, below, plenum housing 24, placing plenum housing 24 and support structure 22 between sensor assembly 30 and article 11 or segment 17 (FIG. 8). Plenum housing 24 may include a plenum aperture 72 for such an embodiment, to enable emission 33 to pass completely through plenum housing 24, the plenum cavity and aperture 28 of support structure 22 to sense the location of the article 11 or segment 17.

Sensor assembly 30 may include a cover 39 with, for example, a window 37 to protect sensor 32 (FIGS. 2 and 4) from such hazards as debris or dirt that may affect the accuracy of sensor 32. In certain embodiments, base plate 40 may receive sensor 32, for example, in a side-ways orientation to limit the overall height of sensor assembly 30. In embodiments where space allows base plate 40 may receive sensor 32 in other orientations. Base plate 40 may include an inclined surface 42 (FIG. 3) adapted to redirect emission 33 from a first direction to a second direction. For example, in one embodiment, sensor 32 may project emission 33 in a substantially horizontal direction, and inclined surface 42 may redirect emission 33 to a substantially vertical direction. Inclined surface 42 may include a reflective surface such as a polished planar surface, or may be adapted to receive a reflector 44, such as a mirror made from polished metal or mirrored glass. Window 37 of cover 39 may be a glass plate adapted to permit transmission of emission 33, while not absorbing, reflecting or otherwise diverting the energy of emission 33. For example, window 37 may be a glass plate having a non-reflective coating. Other sensors may use coherent energy or other reflected energy arrangements.

Figure 5:
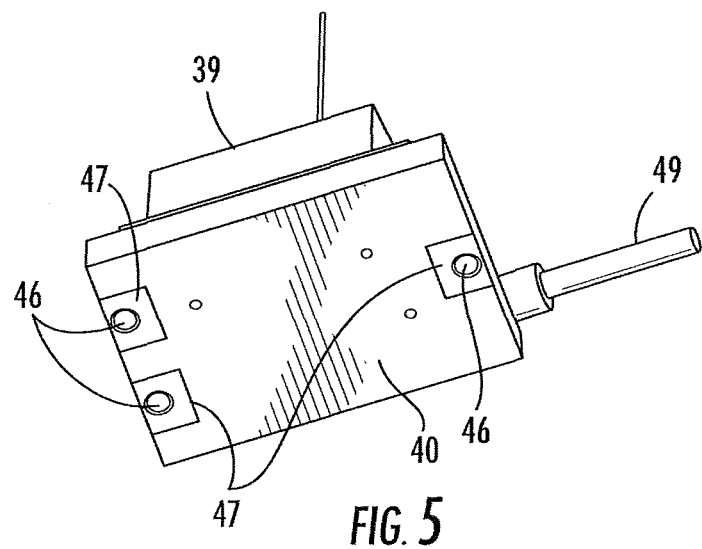
FIG. 5 is a bottom perspective view of the sensor assembly of FIG. 3.

Base plate 40 may include at least one mounting pad 46 (FIG. 5) for contacting the mounting surface of, for example, plenum housing 24. In exemplary embodiments, base plate 40 may include three mounting pads 46 for a three-point contact to the mounting surface. Mounting pads 46 are adapted to raise a portion of base plate 40 above the mounting surface to reduce the actual contact area, insuring greater repeatability for removal and reinstallation, for example, for servicing any portion of sensor assembly 30. Mounting apertures 47 may be located through mounting pads 46 to reduce any twisting or torque effect from mounting base plate 40 onto the mounting surface. In other words, mounting screws used to tightly secure base plate 40 to the mounting surface will not adversely affect the structure of base plate 40, presenting base plate 40 as a reliable platform for receiving sensor 32. Base plate 40 may be made from such materials as an aluminum alloy, a steel alloy, a plastic or other suitable materials.

In exemplary embodiments, sensor assembly 30 may be in communication with control unit 50 via sensor cable 49. Control unit 50 may be in communication with valve body 15. In other embodiments, sensor assembly 30 may be in communication with a data display, for example, a display screen, to inform an operator of the location of article 11 or segment 17. Based upon the location data presented to either the operator or to control unit 50, valve body 15, or gas flow source 18 may be adjusted to allow more or less gas flow into gas channel 14 to increase the pressure within the plenum cavity. Support structure 22, secured to plenum housing 24, may allow the higher pressure gas to pass from the plenum cavity to the lower pressure area outside of the plenum cavity through aperture 28, or gas apertures 23, installed throughout the surface of support structure 22. Pressure within the plenum cavity may be, for example, from about 1 inch water (inH2O) to about 7 inH2O above the pressure outside the plenum cavity, inducing gas to flow out through the apertures. This may change the location of article 11 or segment 17 relative to support structure 22 by reducing or increasing the thickness of a gas layer 70 (FIG. 7) supporting article 11 or segment 17.

Figure 3:
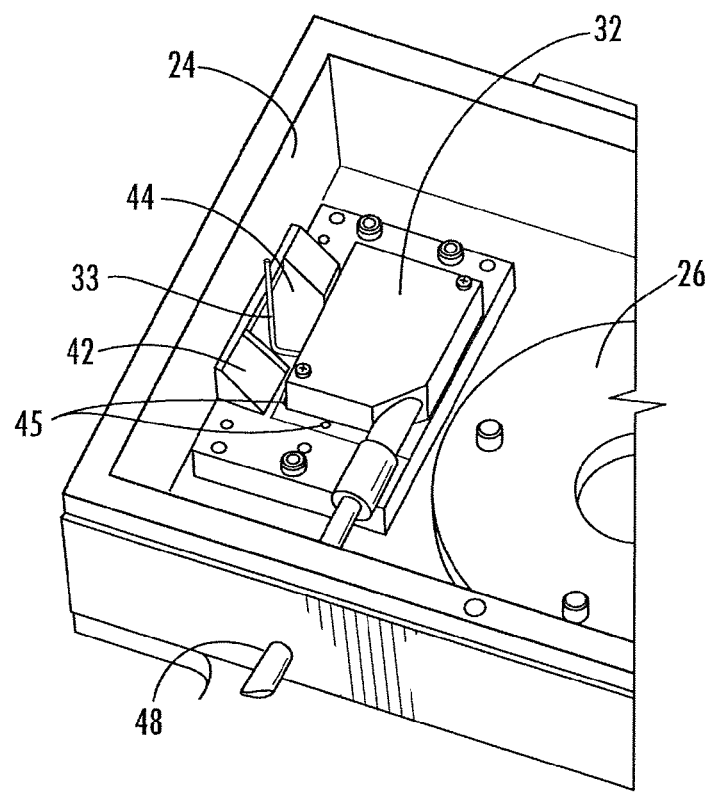
FIG. 3 is a perspective view of the interior of the bearing assembly, showing part of a sensor assembly.
Figure 4:
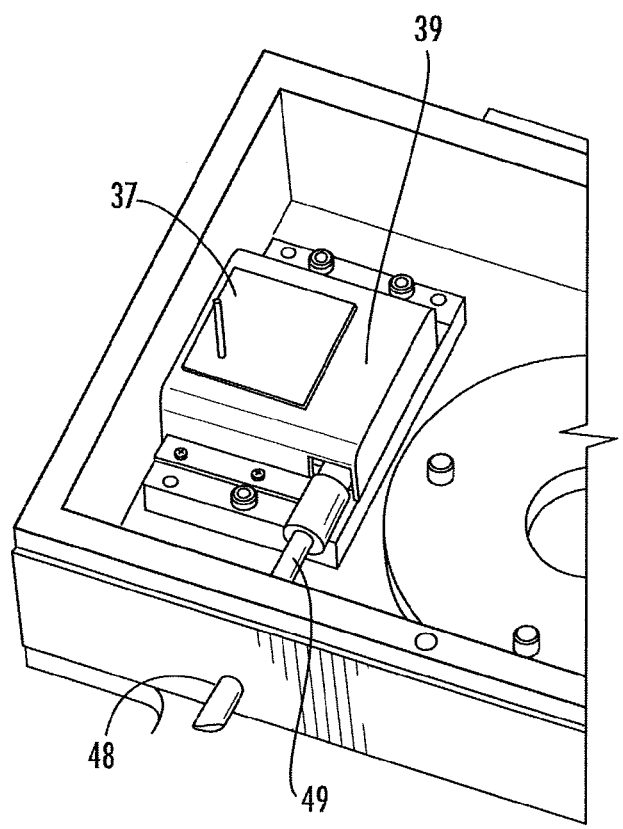
FIG. 4 is a perspective view of the interior of the bearing assembly, showing part of a sensor assembly.

Installing sensor assembly 30 to bearing assembly 20 involves, in one embodiment, removing support structure 22 to reveal the interior of plenum housing 24. A template for cutting bolt holes may be placed in a desired location, for example, near a center axis of plenum housing 24, and bolt holes may be drilled, or otherwise cut, into, for example, the floor of plenum housing 24. A cable aperture 48 to allow ingress and egress of sensor cable 49 may be drilled or cut into, for example, a side wall of plenum housing 24 (FIG. 3). Sensor 32 may be secured to base plate 40 by means of, for example, provided mounting features on sensor 32. In some embodiments, sensor 32 may be mounted side-ways, so that emission 33 encounters, for example, reflector 44. In alternate embodiments, where sensor 32 may be in a vertical orientation, emission 33 may not encounter a reflector 44. Cover 39 may be installed after sensor 32 is secured to base plate 40.

Base plate 40 may be placed on the mounting surface, taking care to align mounting apertures 47 to the corresponding bolt holes on the mounting surface. Bolts may be used to secure base plate 40 to the mounting surface; however, other such attachment means as screws, push-pins, rivets, and adhesives may be used. Sensor cable 49, being secured to either control unit 50 or to a data display unit, may be threaded through cable aperture 48 and mated to laser sensor 32.

Once in place on the mounting surface, base plate 40 may be positioned, for example, by use of alignment mechanism 60. At least one alignment mount 62 having an alignment mechanism 60 affixed may be placed on at least one predetermined location on base plate 40. In some embodiments, three alignment mounts 62, each mount affixed to an alignment mechanism 60, may be mounted to base plate 40. Alignment mount 62 may be a machined metal arm, or a molded plastic arm, which is adapted to receive alignment mechanism 60 and attach to base plate 40. Alignment mechanism 60 may be a manual micrometer that pushes against a substantially unyielding surface while being turned, for example, against a wall, column, or partition found on plenum housing 24, causing a counter force to move alignment mount 62 as well as anything affixed to alignment mount 62. Alignment mechanism 60 may also be a servo driven actuator that may respond to an electrical or optical signal.

Figure 6:
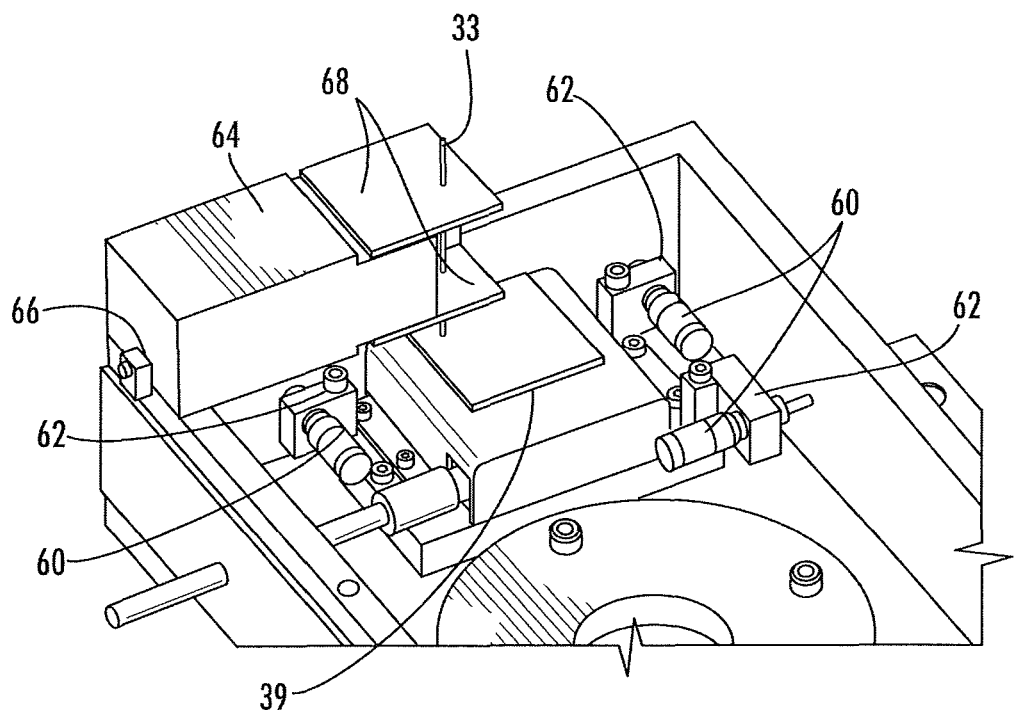
FIG. 6 is a perspective interior view of the bearing assembly of FIG. 2, showing an alignment fixture.

In exemplary embodiments, alignment mechanism 60 (FIG. 6) may be assisted by an alignment fixture 64 to fine tune the alignment of sensor assembly 30. Alignment fixture 64 may be placed along a portion of plenum housing 24. Alignment fixture may have at least two plates 68, for example, glass plates, situated parallel to each other and substantially perpendicular to the desired path of emission 33. Each plate 68 may be scribed or marked with indicia that, in alignment, may coincide with the desired path of emission 33, allowing emission 33 to pass through aperture 28. Aperture 28, in some embodiments, may be a slotted opening to allow emission 33 to enter and exit from two different angles. Other sensors may require different shaped openings. Once sensor assembly 30 is tuned so that emission 33 may travel in the desired path, alignment fixture 64 may be removed, and support structure 22 may be replaced onto plenum housing 24. In some embodiments, sensor assembly 30 may be installed onto bearing assembly 20 as a retrofitted assembly, requiring, for example, drilling bolt holes in the field, or manufactured and assembled as an original equipment assembly.

Sensor assembly 30 may be calibrated and a set point established by placing, for example, an object that closely matches the shape or contour of support structure 22 over aperture 28, which may approximate a "bottom" of support structure 22. A location may be established for the "bottom" of support structure 22, and that location may be set, zeroed, noted, or otherwise fixed as a starting location. In an exemplary embodiment, a value recorded for the location of an article that is greater than the starting location may be considered a positive "height" above, for example, the bottom of support structure 22. In some embodiments, a value for maximum and minimum height may alert either the operator by means of a display or an alarm, or control unit 50 by means of a preset value or range of values, to take action to adjust gas flow into bearing assembly 20 by, for example, opening or closing valves, or by decreasing or increasing the speed of blower 18. In some embodiments, if the value is above a preset maximum value, article 11 or segment 17, may flutter or vibrate, causing product damage. For example, in an embodiment where article 11 is a ceramic extrudate, the surface or internal structure of the extrudate may be damaged. In embodiments where article 11 is, for example, a glass sheet, the glass sheet may, for example, become misaligned from its desired travel path, where it may encounter objects or another glass sheet and become damaged. If the value is below a preset minimum value, article 11 or segment 17 may not travel floatingly and may actually scrub, rub, or otherwise make contact with support structure 22, possibly damaging article 11.

Figure 7:
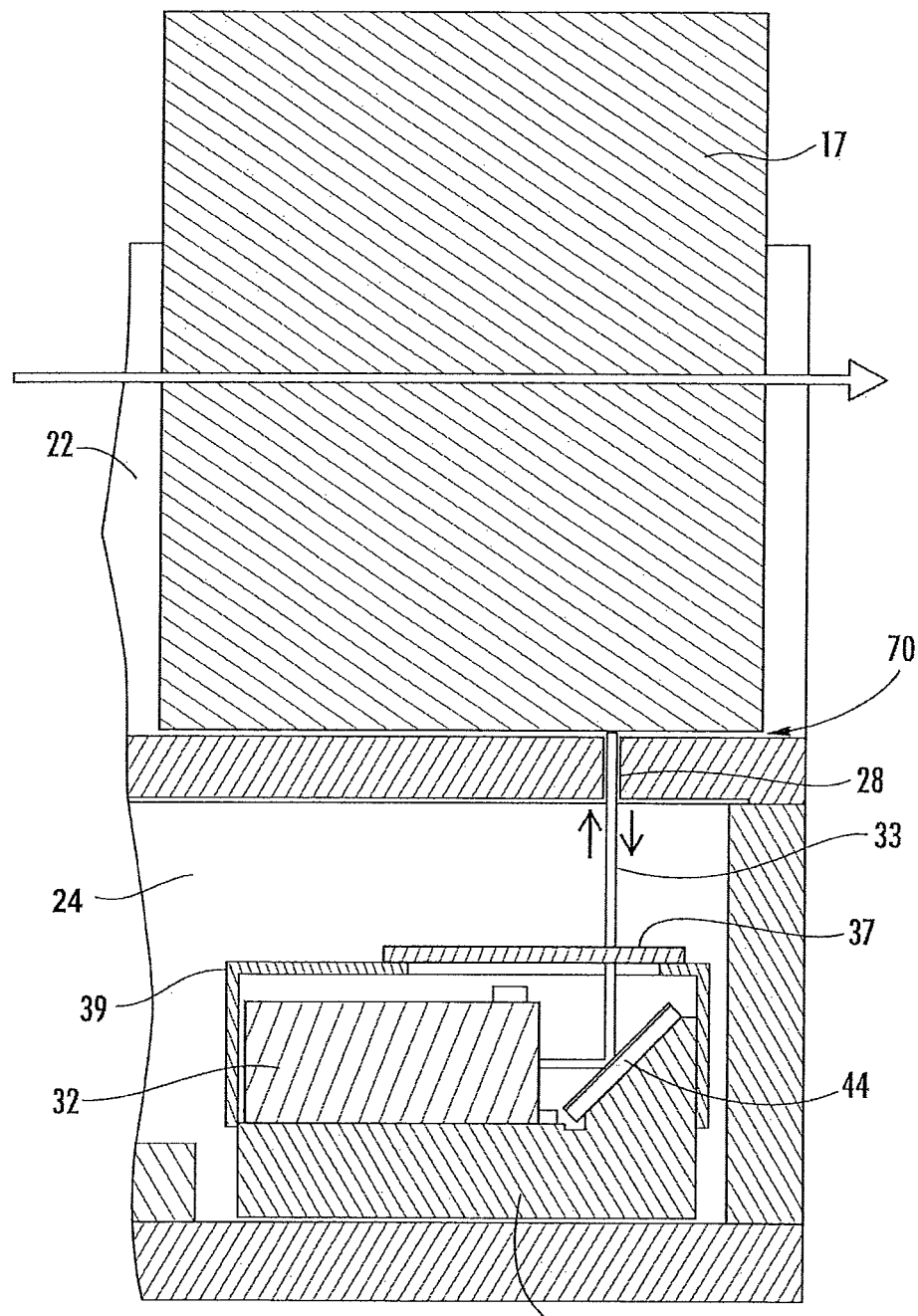
FIG. 7 and FIG. 8 are side sectional views of the bearing assembly.

In one embodiment, extruder 13 may extrude article 11, which may then be cut into segment 17, onto bearing assembly 20. Segment 17 may continue in a longitudinal direction, as indicated by the arrow (FIG. 7). Bearing assembly 20 includes, for example, an air bearing to floatingly transport the extrudate from the extruder to, for example, ceramic dryer 12. As article 11 passes over aperture 28, emission 33, projecting upward through aperture 28 from sensor assembly 30, may encounter a portion of the outer surface of article 11 and reflect a return emission to sensor 32. Sensor 32, in exemplary embodiments, may calculate the location data or height of article 11 based upon the return emission. In alternate embodiments, a separate processor unit may calculate the location data. Sensor 32 may communicate or transmit the acquired data to either a display, as in an open loop feedback system, or to control unit 50, as in a closed loop feedback system. The open loop feedback system may require monitoring by an operator to manually adjust the height of article 11 or segment 17. The closed loop feedback system may automatically adjust the height of article 11 or segment 17.

In exemplary embodiments, sensor assembly 30 may include a sensor that measures the speed as well as the location of article 11, or segment 17. In addition to communicating with control unit 50 to adjust gas flow, such an embodiment may communicate with, for example, the extruder 13 to increase or decrease the speed at which the article 11 is extruded onto the bearing assembly. The speed measurement may be independent of the location measurement, for example, using a discrete speed sensor device, or may be done simultaneously using, for example, an integrated speed and location sensor device.

Unless otherwise expressly stated, it is in no way intended that any method set forth in the disclosure be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method of monitoring and adjusting a location of an article in longitudinal motion on a transport apparatus, comprising:
    providing an article;
    providing a transport apparatus, the transport apparatus adapted to receive the article on a layer of a gas from a gas flow source, the gas flow source providing a flowing gas from a plenum cavity which transports the articles at least in longitudinal motion, and the transport apparatus including at one support structure, the support structure including a first side and a second side, and a surface disposed between the first and second sides, the surface being configured to receive the article, the support structure having at least one sensor aperture disposed through the surface to the plenum cavity;
    providing at least one sensor assembly, the sensor assembly configured to transmit and receive an energy emission at least through the at least one sensor aperture to sense a location of the article;
    providing at least one control unit, the control unit being in communication with the at least one sensor assembly and the gas flow source;
    projecting the energy emission from the sensor assembly onto a surface of the article;
    reflecting the energy emission from the surface of the article;
    receiving the reflected emission by the sensor assembly;
    calculating the location data by the sensor assembly using the reflected emission;
    transmitting the location data from the sensor assembly to the control unit;
    comparing the location data by the control unit to a predetermined range of location data values;
    transmitting an instruction signal from the control unit to the gas flow source in response to the comparison of the data to the predetermined range of location data values; and
    increasing or decreasing the volume of flowing gas to the transport apparatus from the gas flow source in response to the instruction signal from the control unit.

2. The method of claim 1, the step of providing the transport apparatus including providing at least one plenum housing, the plenum housing receiving the support structure to define the plenum cavity, the plenum cavity configured to receive and direct the flowing gas.

3. The method of claim 2, including the step of providing a valve body for controlling the flowing gas, the valve body in communication with both the gas flow source and the control unit, the gas flow source providing gas flow through the valve body to the plenum cavity.

4. The method of claim 1, the article being a ceramic extrudate.

5. The method of claim 1, the article being a glass sheet.

6. The method of claim 1, wherein calculating the location data comprises calculating the location of the article relative to a height above the support structure surface.

7. The method of claim 1, wherein increasing or decreasing the volume of flowing gas comprises adjusting the location of the article above the surface of the support structure.

8. The method of claim 1, wherein providing the at least one sensor assembly, comprises providing a sensor selected from the group consisting of: a laser sensor, a magnetic sensor, an electromagnetic sensor, an electrostatic sensor, a capacitance sensor, an ultrasonic sensor, a photoelectric sensor, an inductive sensor, and combinations thereof.

9. The method of claim 1, wherein providing the at least one sensor assembly, comprises providing a base plate to receive the sensor, and an adjustment mechanism configured to adjust the position of the sensor assembly.

10. The method of claim 1, wherein projecting the energy emission from the sensor assembly onto a surface of the article comprises adjusting the position of the sensor assembly to project the energy emission through the at least one sensor aperture.

11. The method of claim 1, wherein the sensor assembly is disposed within the plenum cavity.

12. The method of claim 2, wherein the sensor assembly is disposed outside the plenum housing.

13. The method of claim 2, wherein the plenum housing comprises at least one plenum aperture in substantial axial alignment to the at least one sensor aperture, the sensor assembly determining the location of the article relative to the support structure through at least the at least one plenum aperture and the at least one sensor aperture.

14. The method of claim 1, wherein the support structure comprises gas apertures disposed throughout the surface, the gas apertures configured to permit a portion of the gas to pass therethrough to form the gas layer.

15. The method of claim 14, wherein the at least one sensor aperture of the surface structure includes one of the gas apertures.

16. The method of claim 1, wherein the at least one sensor aperture of the surface structure permits a portion of the gas to pass therethrough.

\* \* \* \* \*